Patented June 18, 1940

2,204,870

UNITED STATES PATENT OFFICE 2,204,870

RUBBER COMPOSITION AND PRESERVATION OF RUBBER

Robert L. Sibley, Nitro, W. Va., assignor to Monsanto Chemical Company, St. Louis, Mo., a corporation of Delaware No Drawing. Original application April 3, 1936, Serial No. 72,666. Divided and this application September 14, 1937, Serial No. 163,821

6 Claims. (Cl. 260—809)

The present invention relates to the art of rubber manufacture, and particularly relates to the preparation of rubber compounds which resist deterioration due to the effects of heat and/or oxygen. It has long been known that such deterioration can be retarded to a certain degree by treating the rubber either before or after vulcanization with certain substances known as age-resisters or antioxidants. One object of the invention is to provide a superior class of antioxidants for rubber. A further object of this invention is to provide a class of materials which, when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual service.

The age resisting characteristics of a vulcanized rubber product can be readily ascertained by subjecting portions of the vulcanized product in a bomb to the action of 300 pounds of oxygen per square inch at a temperature of 70° C. The aged rubber samples are then examined and tested and the test data compared with the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending on the test.

The flex cracking resistance of the vulcanized rubber products may be determined on a flexing machine as set forth by L. V. Cooper, Analytical Edition of Industrial and Engineering Chemistry, vol. 2, No. 4, 1930, pages 391-394.

This invention comprises treating rubber with an alkyl or aralkyl substituted diaryl arylene diamine, said alkyl group preferably containing more than three carbon atoms. The products of the present invention are obtainable by reacting a diaryl arylene diamine with an aralkyl halide or an alkyl halide preferably containing more than three carbon atoms. As examples of secondary aromatic amines which are reactive with alkyl halides and aralkyl halides to produce the preferred class of anti-oxidants are diphenyl p-phenylene diamine, diphenyl m-phenylene diamine, diphenyl o-phenylene diamine, di beta naphthyl p-phenylene diamine, di alpha naphthyl p-phenylene diamine, di tolyl p-phenylene diamine, di beta naphthyl benzidine and analogues and equivalents thereof. As alkyl and aralkyl halides there may be employed benzyl chloride, n-butyl chloride, amyl halide and analogues and equivalents thereof. Preferably the alkyl halides contain more than three carbon atoms.

Example I

As one specific embodiment of the invention, which is understood in no sense as limiting the scope thereof, substantially 0.1 mol (26 parts by weight) of diphenyl p-phenylene diamine and 0.1 mol (13 parts by weight) of benzyl chloride were reacted in a manner analogous to that given by Meldola in Journal of The Chemical Society, vol. XLI, page 198 (1882) by heating in the presence of a suitable catalyst or condensing agent, for example anhydrous zinc chloride, at a convenient temperature, for example 150° to 160° C., for substantially two to three hours. The reaction product so formed was then digested with hot water to dissolve the zinc chloride. After removal of the water the residue was extracted with a suitable solvent, for example benzene, and the solvent removed therefrom. The residual material comprising the preferred product, which is believed to possess the structural formula

was incorporated in the well-known manner in a rubber tread stock comprising

|  | Parts |
| --- | --- |
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| Reaction product of substantially equimolecular proportions of diphenyl-p-phenylene diamine and benzyl chloride | 1.0 |

The rubber stock so compounded was vulcanized by heating in a press at varying steam pressures and the vulcanized rubber aged in the oxygen bomb at a temperature of 70° C. and under a pressure of 300 pounds of oxygen per square inch. The results follow in Table I.

Table I

| Cure | | Hrs. aged | Modulus of elasticity lbs./in.² at elongations of— | | | | Tensile at break in lbs./in.² | Ult. elong., percent |
| --- | --- | --- | --- | --- | --- | --- | --- | --- |
| Mins. | Lbs. steam pressure | | 200% | 300% | 400% | 500% | | |
| 60 | 30 | 0 | ---- | 1985 | ---- | 3830 | 4160 | 530 |
| 60 | 30 | 96 | 1165 | ---- | 2415 | ---- | 2700 | 470 |
| 75 | 30 | 0 | ---- | 2080 | ---- | 3890 | 4165 | 525 |
| 75 | 30 | 96 | 1245 | ---- | 2540 | ---- | 2625 | 405 |
| 90 | 30 | 0 | ---- | 2265 | ---- | 4050 | 4173 | 510 |
| 90 | 30 | 96 | 1275 | ---- | ---- | ---- | 2455 | 390 |

An examination of the data given in Table I shows the preferred class of compounds, for example the reaction product of diphenyl p-phenylene diamine and benzyl chloride, possesses exceptionally good aging properties. Moreover, when portions of the unaged rubber stocks were flexed in the manner hereinbefore set forth, the stocks containing the preferred class of materials were found to possess exceptionally good flexing properties. Portions of the above unaged vulcanized rubber stocks were artificially aged in the Geer oven for 3 days at a temperature of 70° C. and then flexed in the manner described above. Here, even after this drastic treatment, the aged rubber stocks possessed exceptionally good flexing properties.

Diphenyl p-phenylene diamine exhibits poor solubility and "blooms" or migrates to the surface of the vulcanized rubber product within a few hours after vulcanization. This property renders it undesirable for commercial application. The preferred class of materials, for example the reaction product of diphenyl p-phenylene diamine and benzyl chloride, does not exhibit this undesirable property.

*Example II*

As a further specific example of the present invention a diaryl arylene diamine, for example diphenyl p-phenylene diamine, has been reacted with benzyl chloride in the presence of anhydrous zinc chloride in the ratios of substantially one molecular proportion of the former to substantially two molecular proportions of the latter in a manner analogous to that employed in the preparation of Example I. The product so obtained which is believed to possess the structural formula of

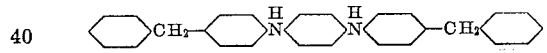

was incorporated in a typical rubber tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| The antioxidant described above | 1.0 |

The rubber stock so compounded was vulcanized and the cured rubber product aged in the oxygen bomb at a temperature of 70° C. and under a pressure of 300 pounds of oxygen per square inch, and on testing the results were obtained as given in Table II.

*Table II*

| Cure | | Hrs. aged | Modulus of elasticity in lbs./in.² at elongations of— | | Tensile at break in lbs./in.² | Ult. elong., percent |
|---|---|---|---|---|---|---|
| Mins. | Lbs. steam pressure | | 200% | 400% | | |
| 60 | 30 | 0 | 1018 | 2870 | 4100 | 530 |
| 60 | 30 | 96 | 1170 | 2500 | 2880 | 470 |
| 75 | 30 | 0 | 1108 | 3025 | 4165 | 525 |
| 75 | 30 | 96 | 1235 | 2610 | 2690 | 410 |
| 90 | 30 | 0 | 1215 | 3130 | 4015 | 515 |
| 90 | 30 | 96 | 1365 | | 2590 | 385 |

From the data set forth in Table II it is readily shown that the reaction products of substantially one molecular proportion of a diaryl arylene diamine, for example diphenyl p-phenylene diamine, and substantially two molecular proportions of an alkyl or aralkyl halide possess exceptional aging properties. Said product showed no "blooming" from the cured rubber product on allowing to stand fifteen days.

*Example III*

The reaction product of substantially equimolecular proportions of diphenyl p-phenylene diamine and amyl chloride has been prepared in a manner analogous to that employed in Example I. The product so obtained was incorporated in a typical rubber tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| The antioxidant described above | 1.0 |

The compounded stock was vulcanized and aged in the oxygen bomb at a temperature of 70° C. and under a pressure of 300 pounds of oxygen per square inch with the following results:

*Table III*

| Cure | | Hrs. aged | Modulus of elasticity in lbs./in.² at elongations of— | | Tensile at break in lbs./in.² | Ult. elong., percent |
|---|---|---|---|---|---|---|
| Mins. | Lbs. steam pressure | | 200% | 400% | | |
| 60 | 30 | 0 | 1255 | 3195 | 4625 | 555 |
| 60 | 30 | 96 | 1295 | 2520 | 2860 | 480 |
| 75 | 30 | 0 | 1365 | 3330 | 4420 | 525 |
| 75 | 30 | 96 | 1325 | 2650 | 2650 | 400 |
| 90 | 30 | 0 | 1380 | 3315 | 4400 | 520 |
| 90 | 30 | 96 | 1390 | | 2715 | 395 |

Portions of the above unaged vulcanized rubber stocks were artificially aged in the Geer oven for 3 days at a temperature of 70° C. and then flexed in the manner described above. Both the aged and unaged rubber stocks exhibited exceptionally good flexing properties.

Furthermore, the cured rubber product showed no "blooming" on allowing to stand for eighteen days.

*Example IV*

Substantially equi-molecular proportions of diphenyl p-phenylene diamine and butyl chloride have been reacted in a manner analogous to that employed in the preparation of Example I. The product so obtained was incorporated in a typical tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Mercaptobenzothiazole | 1 |
| The reaction product of substantially equimolecular proportions of diphenyl p-phenylene diamine and butyl chloride | 1 |

The following results were obtained on aging the cured rubber product in the oxygen bomb at a temperature of 70° C. and under a pressure of 300 pounds of oxygen per square inch.

*Table IV*

| Cure | | Hrs. aged | Modulus of elasticity in lbs./in.² at elongations of— | | Tensile at break in lbs./in.² | Ult. elong., percent |
|---|---|---|---|---|---|---|
| Mins. | Lbs. steam pressure | | 200% | 400% | | |
| 60 | 30 | 0 | 1245 | 3050 | 4250 | 540 |
| 60 | 30 | 96 | 1215 | 2500 | 2820 | 460 |
| 75 | 30 | 0 | 1220 | 3065 | 4280 | 540 |
| 75 | 30 | 96 | 1295 | 2590 | 2620 | 405 |
| 90 | 30 | 0 | 1315 | 3270 | 4370 | 520 |
| 90 | 30 | 96 | 1355 | | 2255 | 345 |

The rubber stocks wherein the reaction product of diphenyl p-phenylene diamine and butyl chloride was incorporated also exhibited very good flexing properties both in the unaged stocks and in the stocks aged for three days in the Geer oven. Further, the stocks wherein the reaction product of diphenyl p-phenylene diamine and butyl chloride was incorporated exhibited the desirable "non-blooming" properties typical of the preferred class of antioxidants.

*Example V*

Substantially equi-molecular proportions of dibeta naphthyl p-phenylene diamine and butyl chloride were reacted in a manner analogous to that employed in the preparation of Example I. The product so produced was incorporated in a tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| The reaction product of substantially equi-molecular proportions of dibeta naphthyl p-phenylene diamine and butyl chloride | 1.0 |

The tensile and modulus characteristics of the unaged cured rubber product and on the same rubber stock after aging for 96 hours in the oxygen bomb at a temperature of 70° C. and under an oxygen pressure of 300 pounds per square inch follow in Table V.

*Table V*

| Cure | | Hrs. aged | Modulus of elasticity in lbs./in.² at elongations of— | | Tensile at break in lbs./in.² | Ult. elong., percent |
|---|---|---|---|---|---|---|
| Mins. | Lbs. steam pressure | | 200% | 400% | | |
| 60 | 30 | 0 | 1210 | 3125 | 4360 | 540 |
| 60 | 30 | 96 | 1085 | 1930 | 1930 | 400 |
| 75 | 30 | 0 | 1305 | 3240 | 4370 | 525 |
| 75 | 30 | 96 | 1040 | | 1670 | 350 |
| 90 | 30 | 0 | 1318 | 3290 | 4350 | 520 |
| 90 | 30 | 96 | 1055 | | 1478 | 330 |

The above rubber stocks wherein the reaction product of dibeta naphthyl p-phenylene diamine and butyl chloride was incorporated exhibited the desirable flexing properties typical of the preferred class of materials and likewise exhibited the typical "non-blooming" properties thereof.

*Example VI*

Ditolyl p-phenylene diamine and benzyl chloride have been reacted in the ratio of substantially equi-molecular proportions thereof in a manner analogous to that employed in the preparation of Example I. The product so obtained was milled in the well-known manner into a typical stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| The reaction product of substantially equi-molecular proportions of ditolyl p-phenylene diamine and benzyl chloride | 1.0 |

The rubber stock so obtained was vulcanized and the cured rubber product aged in the oxygen bomb in the well known manner at a temperature of 70° C. and under an oxygen pressure of 300 pounds per square inch. On testing, the following results were obtained on the unaged and aged vulcanized rubber product.

*Table VI*

| Cure | | Hrs. aged | Modulus of elasticity in lbs./in.² at elongations of— | | Tensile at break in lbs./in.² | Ult. elong., percent |
|---|---|---|---|---|---|---|
| Mins. | Lbs. steam pressure | | 200% | 400% | | |
| 60 | 30 | 0 | 1235 | 3145 | 4300 | 545 |
| 60 | 30 | 96 | 1140 | 2325 | 2590 | 460 |
| 75 | 30 | 0 | 1310 | 3290 | 4490 | 525 |
| 75 | 30 | 96 | 1170 | 2360 | 2495 | 440 |
| 90 | 30 | 0 | 1310 | 3310 | 4325 | 520 |
| 90 | 30 | 96 | 1205 | | 2260 | 390 |

The above rubber stock wherein the reaction product of ditolyl p-phenylene diamine and benzyl chloride was incorporated was found by test to possess the desirable flexing properties typical of the preferred class of rubber antioxidants and also exhibited the typical "non-blooming" properties thereof.

Other catalysts than anhydrous zinc chloride may be employed in the preparation of the preferred class of materials and the products so obtained and the use thereof in the treatment of rubber, particularly in the preservation thereof, is included within the scope of the present invention.

As further specific embodiments of the present invention, substantially one molecular proportion of diphenyl p-phenylene diamine was reacted with substantially one and two molecular proportions respectively of benzyl chloride in the presence of an aqueous sodium hydroxide solution, for example by heating on a water bath in an analogous manner to that given by Meldola, Berichte der deutschen chemischen Gesellschaft, vol. 14, page 1385 (1881) for the reaction between diphenylamine and benzyl chloride. The author states that when a mixture of equimolecular proportions of benzyl chloride and diphenylamine are heated for an hour on a steam bath in aqueous sodium hydroxide, the principal product is benzyl diphenyl amine of melting point 87° C. Analogously the reaction products of diphenyl p-phenylene diamine and benzyl chloride would be a benzyl substituted diphenyl p-phenylene diamine in which the benzyl group was linked to nitrogen. The products so obtained were incorporated in rubber stocks of the following compositions

|  | Stock A parts | Stock B parts |
|---|---|---|
| Smoked sheet rubber | 100 | 100 |
| Carbon black | 50 | 50 |
| Zinc oxide | 5 | 5 |
| Sulfur | 3 | 3 |
| Pine tar | 2 | 2 |
| Stearic acid | 3 | 3 |
| Benzothiazyl thiobenzoate | 0.8 | 0.8 |
| Diphenyl guanidine | 0.2 | 0.2 |
| Reaction product of substantially equi-molecular proportions of diphenyl p-phenylene diamine and benzyl chloride in an aqueous sodium hydroxide solution | 1.0 | ---------- |
| Reaction product of substantially one molecular proportion of diphenyl p-phenylene diamine and substantially two molecular proportions of benzyl chloride in an aqueous sodium hydroxide solution | ---------- | 1.0 |

The above stocks were vulcanized and the cured rubber products aged in the oxygen bomb at 70° C. and under 300 pounds of oxygen pressure per square inch. The results of the aging tests follow in Table VII.

Table VII

| Stock | Cure | | Hrs. aged | Modulus of elasticity in lbs./in.² at elongations of— | | | | Tensile at break in lbs./in.² | Ult. elong., percent |
|---|---|---|---|---|---|---|---|---|---|
|  | Mins. | Lbs. steam pressure |  | 200% | 300% | 400% | 500% |  |  |
| A | 60 | 30 | 0 |  | 1980 |  | 3810 | 4160 | 535 |
| B | 60 | 30 | 0 | 1055 |  | 2890 |  | 4220 | 545 |
| A | 60 | 30 | 96 | 1205 |  | 2600 |  | 3015 | 480 |
| B | 60 | 30 | 96 | 1030 |  | 2110 |  | 2235 | 435 |
| A | 75 | 30 | 0 |  | 2090 |  | 3860 | 4130 | 525 |
| B | 75 | 30 | 0 | 1175 |  | 3080 |  | 4035 | 520 |
| A | 75 | 30 | 96 | 1315 |  | 2765 |  | 2900 | 420 |
| B | 75 | 30 | 96 | 1190 |  |  |  | 2110 | 385 |
| A | 90 | 30 | 0 |  | 2170 |  | 3980 | 4230 | 535 |
| B | 90 | 30 | 0 | 1320 |  | 3270 |  | 4190 | 510 |
| A | 90 | 30 | 96 | 1420 |  |  |  | 2380 | 345 |
| B | 90 | 30 | 96 | 1185 |  |  |  | 1955 | 350 |

From the data set forth above in Table VII it is shown that the preferred class of antioxidants, when prepared in an alkaline medium, possess good antioxidant properties. Furthermore, said materials were found by test to exhibit desirable flex resisting and "non-blooming" properties.

Other methods of preparing the preferred class of materials may be employed as is obvious to those skilled in the art to which the present invention pertains.

Obviously, practice of the present invention is not limited to the specific compositions given above, such compositions being merely illustrative of the manner of employing the antioxidants or age-resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the ones specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

This is a division of my co-pending application Serial No. 72,666, filed April 3, 1936.

What is claimed is:

1. The method of preserving rubber which comprises treating rubber with a compound possessing the structural formula of

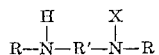

where R' is an arylene radical, R is an aryl radical and X is a member of the class consisting of benzyl groups and alkyl groups containing more than three carbon atoms.

2. The method of preserving rubber which comprises treating rubber with a compound possessing the structural formula of

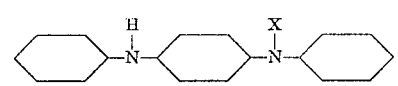

where X is a member of the class consisting of benzyl groups and alkyl groups containing more than three carbon atoms.

3. The method of preserving rubber which comprises treating rubber with N benzyl, N,N' diphenyl p-phenylene diamine.

4. A composition comprising rubber and a compound possessing the structural formula of

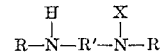

where R' is an arylene radical, R is an aryl radical and X is a member of the class consisting of benzyl groups and alkyl groups containing more than three carbon atoms.

5. A composition comprising rubber and a compound possessing the structural formula of

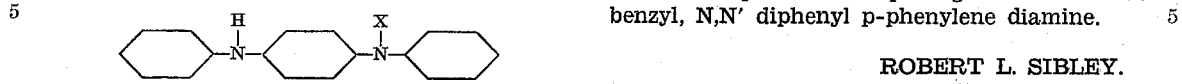

where X is a member of the class consisting of benzyl groups and alkyl groups containing more than three carbon atoms.

6. A composition comprising rubber and N benzyl, N,N' diphenyl p-phenylene diamine.

ROBERT L. SIBLEY.